United States Patent
Shai et al.

(10) Patent No.: US 7,322,734 B2
(45) Date of Patent: Jan. 29, 2008

(54) BACKLIGHT MODULE AND ITS BACK PLATE

(75) Inventors: Ru-Jih Shai, Padeh (TW); Cheng-Min Liao, Padeh (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 11/316,927

(22) Filed: Dec. 27, 2005

(65) Prior Publication Data

US 2007/0147021 A1    Jun. 28, 2007

(51) Int. Cl.
*F21V 7/04* (2006.01)
(52) U.S. Cl. .......................................... 362/633; 349/58
(58) Field of Classification Search ................ 362/580; 349/58
See application file for complete search history.

(56) References Cited

U.S. PATENT DOCUMENTS

| | | | |
|---|---|---|---|
| 6,871,979 B2 * | 3/2005 | Mai ............................ 362/241 |
| 6,961,102 B2 * | 11/2005 | Kitada et al. .................. 349/58 |
| 7,059,757 B2 * | 6/2006 | Shimizu ...................... 362/561 |
| 2005/0253981 A1 * | 11/2005 | Kruijt et al. ................... 349/70 |
| 2006/0098457 A1 * | 5/2006 | Chen et al. ................. 362/632 |

* cited by examiner

*Primary Examiner*—Hargobind S. Sawhney
(74) *Attorney, Agent, or Firm*—Venable LLP; Raymond J. Ho

(57) ABSTRACT

A liquid crystal display (LCD) structure is provided. The LCD structure is that a backlight module having ventilated thin film with high reflective material combines with a liquid crystal panel. The backlight module includes a bottom and at least a ventilated thin film with high reflective material. The side plates of the bottom have at least an opening, and the ventilated thin film with high reflective material is disposed at the openings. The backlight module, making use of the openings at the bottom of the backplate and the ventilated thin film with high reflected material, can improve the heat-dissipating mechanism of the backlight module, thereby, can effectively lower the temperature of the backlight module.

14 Claims, 3 Drawing Sheets

BACKLIGHT MODULE AND ITS BACK PLATE

BACKGROUND OF THE INVENTION

1. Field of the Invention

The invention relates to a liquid crystal device (LCD), and more particularly to a liquid crystal device having a ventilated thin film with high reflective material.

2. Description of the Prior Art

Following the development of science and technology, the volume of the display device is gradually reduced, and the weight becomes relatively lighter. Although the conventional display devices with cold cathode fluorescent tubes have their merits, they are bulky and power consuming. For these reasons, the plane display device, such as liquid crystal device (LCD), plasma display device, and electrically actuating display device etc. has gradually become the main stream of the display device. Among them, LCD has become very popular in the market due to its advantages of having relatively low operating voltage, no radioactivity, light in weight, and small in volume etc. It is necessary for a backlight module to provide a light source since the liquid crystal elements themselves in the LCD structure are not luminous.

One can classify the backlight module into two types, a side light type backlight module and a direct type backlight module, depending on the location of the light source disposed in the liquid crystal device. The light source of the side light type backlight module is disposed on a side plate of the liquid crystal device. A light-guiding plate is needed to guide the light beam illuminated from a light source through a diffuser and a reflector to uniformly illuminate on the display panel of the LCD.

On the contrary, the light beam of the direct type backlight module, through a diffuser and a reflected sheet, directly and uniformly illuminate on the liquid crystal (LC) panel without the need of a light guiding plate. Therefore, this type of backlight module can be used in a relatively larger size of LCD since it is relatively higher in light transmissibility.

The heat source inside the backlight module mainly comes from the cold cathode fluorescent tubes installed therein, and the luminous efficiency of the cold cathode fluorescent tubes is apt to be affected by the temperature change. FIG. 1 is a conventional backlight module. As shown in FIG. 1, since the interior of a backlight module 10 having cold cathode fluorescent tubes 11 contained therein is a closed space, the air heated by the cold cathode fluorescent tubes 11 inside the closed space is unable to generate convection with respect to the outside environment causing the non-uniformity of the interior temperature. The heat generated inside the backlight module needs to transfer to the exterior parts, then, irradiate from the surface of the exterior parts toward the outside environment. Consequently, the heat dissipation of this kind of conventional backlight module 10 is not effective and the temperature inside the backlight module is not apt to lower. This will not only affect the luminous efficiency of the cold cathode fluorescent tubes but also affect the quality of displaying picture of the LCD.

As the trend of the size of the LCD is getting bigger and bigger nowadays, the number of the cold cathode fluorescent tubes and the temperature of the backlight module are getting higher. How to lower the temperature of the backlight module to avoid the lowering luminous efficiency of the light source is an important issue of study on the backlight module.

SUMMARY OF THE INVENTION

The object of the invention is to resolve the problem that the air inside the backlight module of the LCD (Liquid Crystal Display) of the prior art cannot generate convection with respect to the outside environment. As a result, the temperature inside the backlight module is not uniformly distributed which affects the quality of the LCD.

To achieve the above-mentioned objectives, the present invention provides a backlight module applying in a LCD structure therein. The backlight module includes a backplate, which have a bottom and at least a side wall extending upward from the bottom and the side wall including several openings apart from each other, at least a ventilated thin film with high reflected material on the openings, a light source disposed above the bottom, and a diffuser disposed above the light source.

The high reflected material used by the above-mentioned ventilated thin films is a resin-based material of light stabilizer and reflected agent.

The LCD structure of the invention, making use of the openings on the side wall of backplate and the ventilated thin film with high reflected material, can improve the heat-dissipating mechanism of the backlight module, thereby, can effectively lower the temperature of the backlight module.

The present invention also provides an LCD. The LCD comprises a backlight module and an LC panel. The backlight module includes a backplate, which have a bottom and at least a side wall extending upward from the bottom and the side wall having several openings apart from each other, at least a ventilated thin film with high reflected material on the openings, a light source disposed above the bottom, and a diffuser disposed above the light source. The LC panel is a panel after finishing cell process and consists of a display surface and a backlight combining surface for combining with the backlight module.

The accomplishment of this and other objectives of the invention will become apparent from the following description and its accompanying drawings of which:

DETAILED DESCRIPTION OF THE PREFERRED EMBODIMENT

Figure 1:
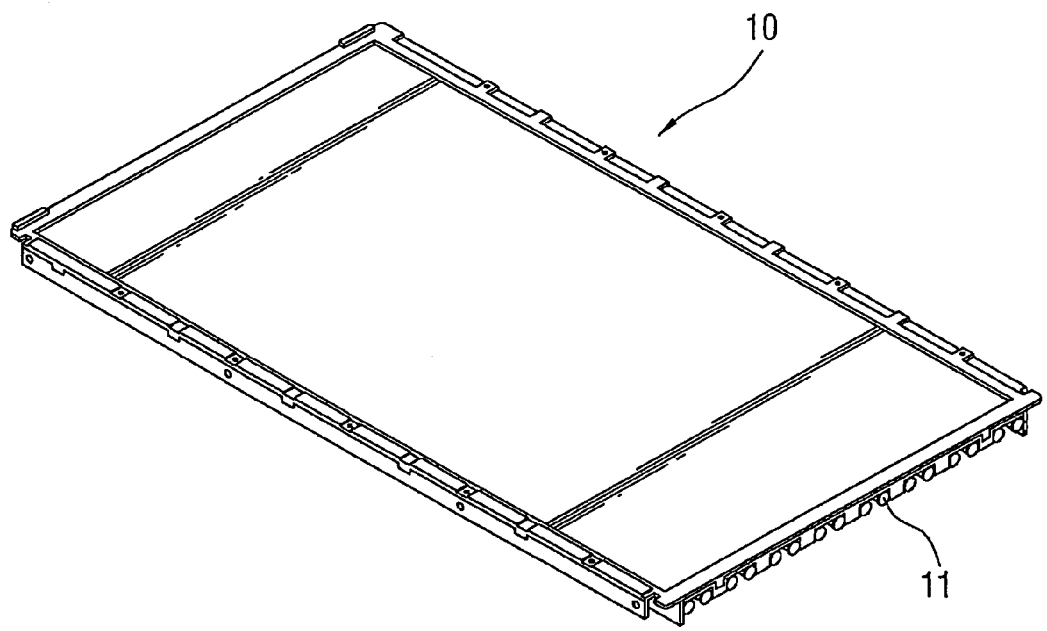
FIG. 1 is a three dimension view of a conventional backlight module.
Figure 2:
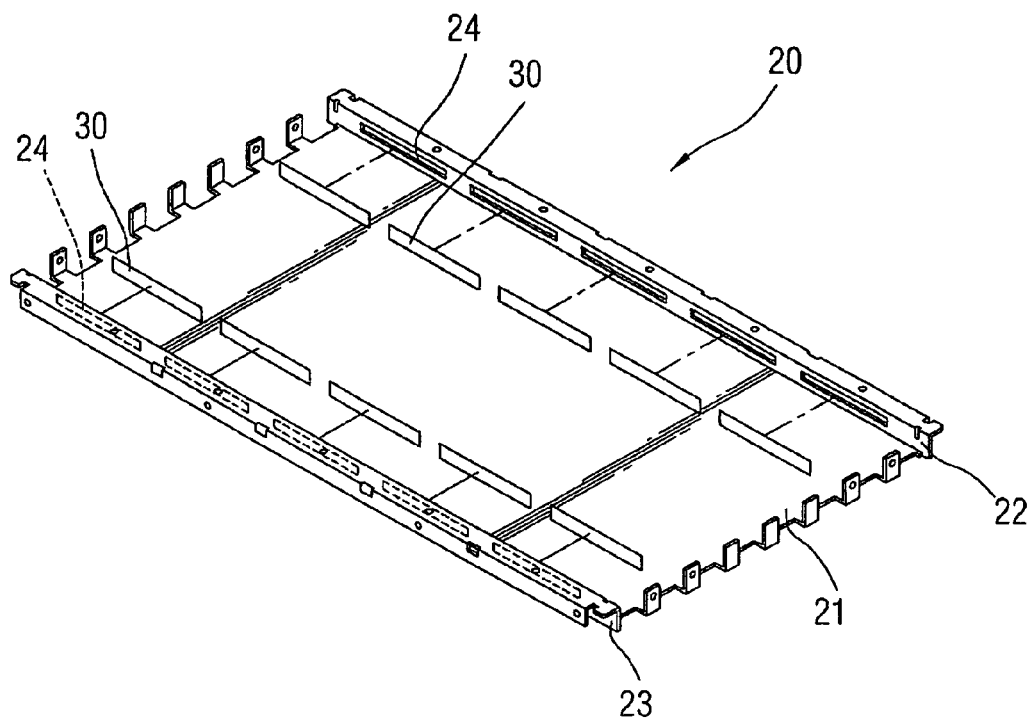
FIG. 2 is a backplate structure diagram of the preferred embodiment of the invention.

FIG. 2 is a backplate structure diagram of the preferred embodiment of the invention. The backplate 20 is utilized in a backlight module 10'. As shown in FIG. 2, the backplate 20 includes a bottom 21 and at least a ventilated thin film 30 with high reflected material. The bottom 21 of the backplate 20 has a first side plate 22 and a second side plate 23, and each of the first side plate 22 and second side plate 23 has a plurality of openings 24 that can have various kinds of shape such as rectangular, square, circle, and other shapes. One of the reasons why these openings 24 are disposed on the first side plate 22 and the second side plate 23 is that they are not the emanated portion of the light beam of the backlight module 10', and the optical utility rate is relatively low, thereby, the disposition of these openings 24 can reduce the loss of optical energy. The ventilated thin films 30, with high reflected material, that employ a white nonwoven fabric or a nonwoven fabric with a plurality of holes are adhered on these openings 24 for ventilation so that the air in the backlight module 10' can generate convection and ventilate to the outside environment. Moreover, they can make use of the principle of convective heat dissipation to reduce the temperature inside the backlight module 10'. Besides, since the ventilated thin film 30 with high reflective material is white in color or having high reflective matter coated thereon, it is low in absorption rate with respect to light, and it can reduce the loss of optical energy caused by the openings 24. Consequently, the hot air in the backlight module 10' is apt to achieve thermal equilibrium with the surrounding environment.

The embodiment has the following advantages: Firstly, the plurality of openings 24 having ventilated thin films 30 with high reflective material can enhance the heat dissipating efficiency, make the inside temperature relatively uniform, and improve the luminous efficiency of the backlight module 10'. Secondly, it can reduce the weight as the bottom 21 of the backplate 20 has a plurality of openings 24.

Figure 3:
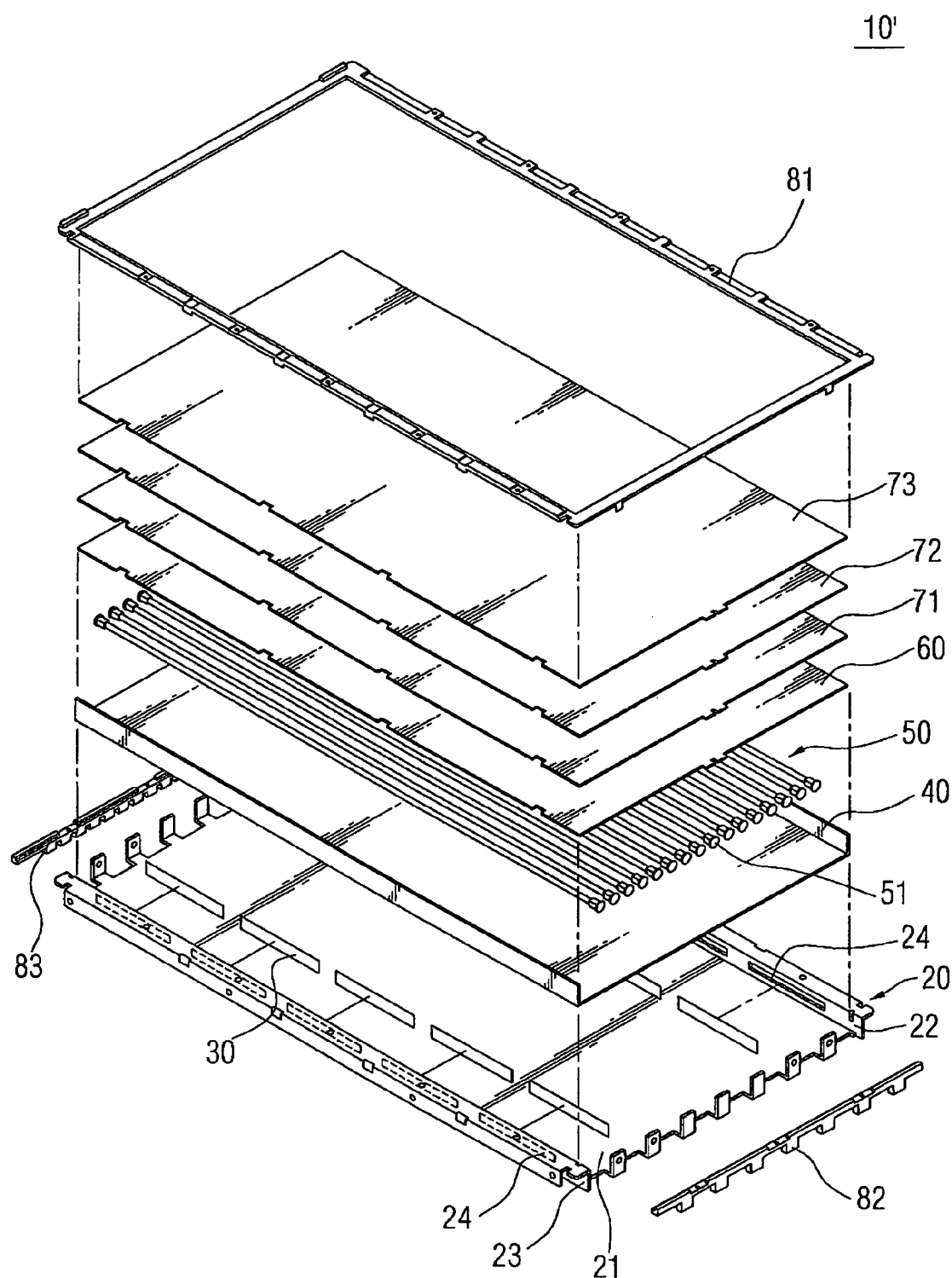
FIG. 3 is a structure diagram of the backlight module of the invention.

FIG. 3 is a structure diagram of the backlight module 10' of the invention. As shown in FIG. 3, the three-dimensional structure of the backlight module 10' of the invention includes a backplate 20, at least a ventilated thin film 30 with high reflective material, a light source 50, and a diffuser 60. Among them, the backplate 20 has a bottom 21, a first side plate 22, and a second side plate 23, and each of the first side plate 22 and second side plate 23 of the backplate 20 has a plurality of openings 24 that can have various kinds of shape such as rectangular, square, circle, and other shapes. The ventilated thin films 30, with high reflected material, that employ a white nonwoven fabric or a nonwoven fabric with a plurality of holes are adhered on these openings 24 for ventilation so that the air in the backlight module 10' can generate convection and ventilate to the outside environment. Moreover, they can make use of the principle of convective heat dissipation to reduce the temperature inside the backlight module 10'. Besides, since the ventilated thin film 30, which may be a titanium dioxide (TiO2), is white in color or with high reflective material coated thereon, it is low in absorption rate with respect to the light beam, and it can reduce the loss of optical energy caused by the openings 24. Consequently, the hot air in the backlight module 10' is apt to achieve thermal equilibrium with the surrounding environment. The light source 50 consists of a plurality of cold cathode fluorescent tubes 51 disposed on the bottom 21 of the backplate 20 where the diffuser 60 for uniformly diffusing the light beam emanated from the light source 50 is also disposed thereon. The backlight module 10' also includes a plurality of optical sheets such as a lower enhancement film 71, a light collecting sheet 72, and an upper enhancement film 73. These optical sheets for improving the luminance and uniformity of the backlight module 10' are disposed on the bottom 21 of the backplate 20. The backlight module 10' further includes a frame 81, a first side frame 82, and a second side frame 83, wherein the first side frame 82 is disposed one side of the bottom 21, while the second side frame 83 is disposed on the other side of the bottom 21. In addition, the frame 81 is disposed on the upper edge of the upper enhancement film 73, while the lower side surface of the frame 81 is attached with the first side frame 82 and the second side frame 83. These frames for making each of the elements of the backlight module 10' more firmly secure are also disposed on the bottom 21 of the backplate 20. In order to enhance the luminance of the backlight module 10' of the invention, one can also provides a reflected layer 40, including a reflected plate or a reflected film, on the backplate 20.

The high reflected material used by the above-mentioned ventilated thin film 30 is a resin-based material of light stabilizer and reflected agent.

According to the foregoing description, the invention has the following advantages as comparing with the prior art. The backlight module 10' and its backplate of the invention, making use of the openings on the backplate and the ventilated thin film with high reflected material, can improve the heat-dissipating mechanism of the backlight module 10'. The heat-dissipating mechanism can effectively lower the temperature of the backlight module 10' and further improve the luminous efficiency of the light source 50.

Figure 4:
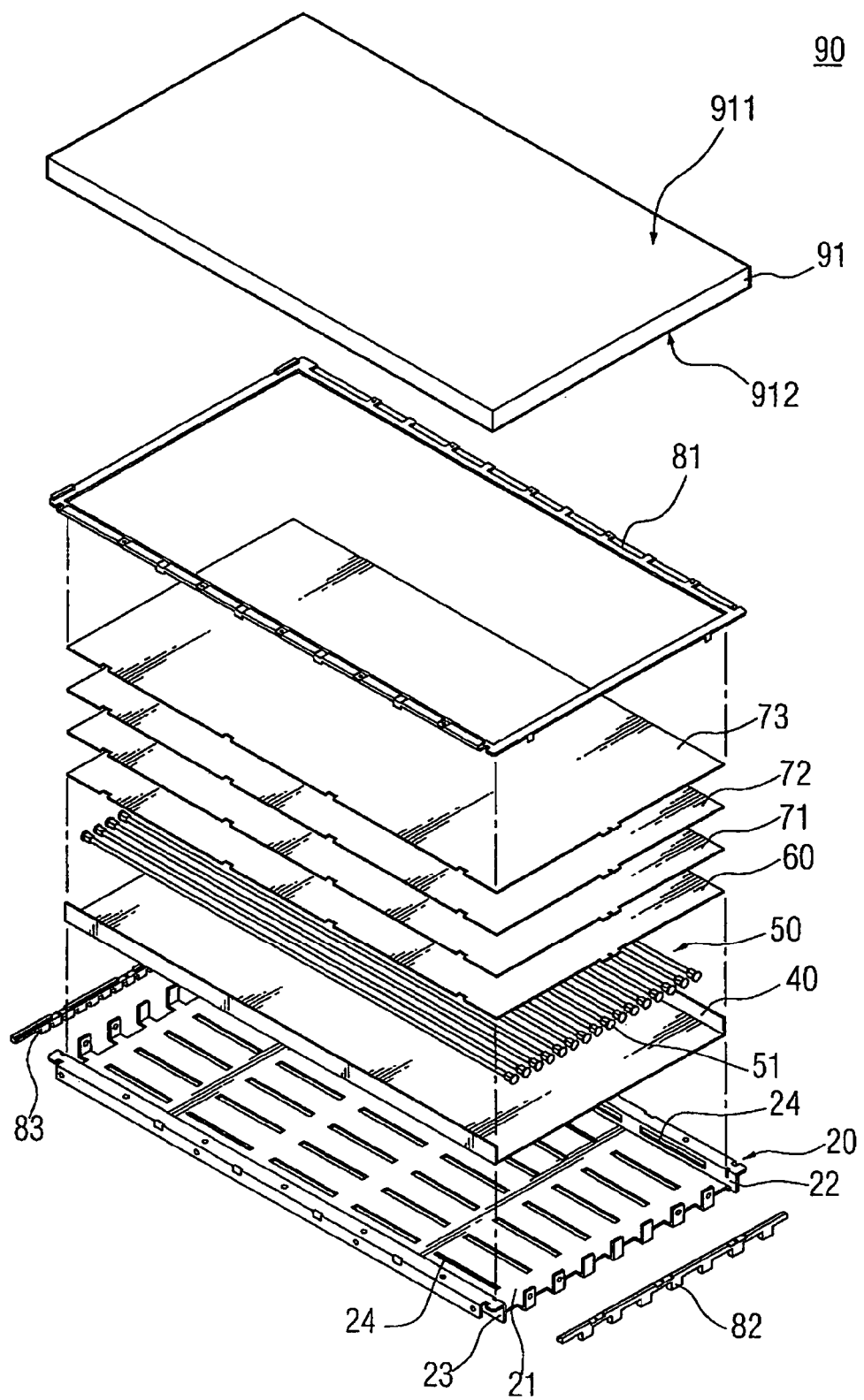
FIG. 4 is a three-dimensional diagram of LCD of the preferred embodiment.

In FIG.4, a three-dimensional diagram of LCD 90 of the preferred embodiment is shown. The LCD comprises a backlight module 10' and a liquid crystal panel 91. The backlight module 10' includes a backplate 20, which have a bottom 21 and at least a side wall extending upward from a side of the bottom and the side wall having several openings 24 with a distance between each other, at least a ventilated thin film 30 with high reflected material on the openings 24, a light source 50 disposed above the bottom 21, and a diffuser 60 disposed above the light source 50.

The liquid crystal panel 91 is a panel after finishing cell process and consists of a display surface 911 and a backlight combining surface 912 for combining with the backlight module 10'.

It will become apparent to those people skilled in the art that various modifications and variations can be made to the structure of the invention without departing from the scope or spirit of the invention. In view of the foregoing description, it is intended that all the modifications and variation fall within the scope of the following appended claims and their equivalents.

What is claimed is:

1. A backlight module, applying in a liquid crystal display (LCD), comprising:
   a backplate having a bottom and at least a side wall extending upward from the bottom and the side wall having a plurality of openings apart from each other;
   at least a non-woven fabric with a highly reflective material coated thereon disposed on the openings, wherein the non-woven fabric has a plurality of holes;
   a light source disposed above the bottom; and
   a diffuser disposed above the light source; and further comprising a frame, a first side frame, and a second side frame on the bottom of the backplate, wherein the first side frame is disposed on one side of the bottom, while the second side frame is disposed on the other side of the bottom, and the frame is disposed on the upper edge of an enhancement film, while the lower side surface of the frame is attached with the first side frame and the second side frame.

2. The backlight module as claimed in claim 1, further comprising a reflective layer on the backplate.

3. The backlight module as claimed in claim 1, further comprising at least an optical sheet disposed above the bottom of the backplate.

4. The backlight module as claimed in claim 3, wherein the optical sheet is an enhancement film.

5. The backlight module as claimed in claim 3, wherein the optical sheet is a light collecting sheet.

6. The backlight module as claimed in claim 1, wherein the material of the ventilated thin film with the highly reflective material is a resin-based material consisting of a light stabilizer and a reflective agent.

7. The backlight module as claimed in claim 1, wherein the highly reflective material is a titanium dioxide (TiO2).

8. A liquid crystal display (LCD), comprising:
  a backlight module, including:
  a bottom and at least a side wall extending upward from the bottom, and the side wall having several openings apart from each other;
  at least a non-woven fabric with a highly reflective material formed thereon disposed on the openings, wherein the non-woven fabric has a plurality of holes;
  a light source disposed above the bottom; and
  a diffuser disposed above the light source;
  a liquid crystal panel having a display surface and a backlight surface for combining with the backlight module.

9. The LCD as claimed in claim 8, further comprising a reflective layer on the backplate.

10. The LCD as claimed in claim 8, further comprising at least an optical sheet disposed above the bottom of the backplate.

11. The LCD as claimed in claim 10, wherein the optical sheet is an enhancement film.

12. The LCD as claimed in claim 10, wherein the optical sheet is a light collecting sheet.

13. The LCD as claimed in claim 8, wherein the material of the ventilated thin film with the highly reflective material is a resin-based material consisting of a light stabilizer and a reflective agent.

14. The LCD as claimed in claim 8, wherein the highly reflective material is a titanium dioxide (TiO2).

* * * * *